United States Patent

[11] 3,543,691

| [72] | Inventor | Ernest J. Nagy<br>Munster, Indiana |
|---|---|---|
| [21] | Appl. No. | 835,904 |
| [22] | Filed | June 16, 1969<br>Division of Ser. No. 718,892, Apr. 4, 1968, now pending. |
| [45] | Patented | Dec. 1, 1970 |
| [73] | Assignee | Pullman Incorporated<br>Chicago, Illinois<br>a corporation of Delaware |

[54] OPERATING MECHANISM FOR VEHICLE DISCHARGE MEANS
19 Claims, 11 Drawing Figs.

[52] U.S. Cl.................................................... 105/241,
105/251, 105/290, 105/307
[51] Int. Cl..................................................... B61d 7/30
[50] Field of Search.......................................... 214/58, 63,
44; 105/241, 241(C), 290, 240, 286

[56] References Cited
UNITED STATES PATENTS
528,279  10/1894  Roberts........................105/241(C)UX

| 1,942,702 | 1/1934 | Hosceit...................... | 105/290 |
| 3,316,858 | 5/1967 | Fritz............................. | 214/63X |

Primary Examiner—Robert G. Sheridan
Attorney—Hilmond O. Vogel

ABSTRACT: A railroad hopper door operating mechanism comprising car mounted cam engaging wheel means engaging ground mounted cam means, the wheel means having gear structure rotating about a transverse axis to drive a worm gear means which rotates further gear means about a longitudinal axis of a longitudinally extending door operating shaft connecting with flexible chainlike door opening arms which become rigid strut means in the extended position to hold doors open where the door opening and closing cam means is disposed beneath the hopper car and the between the railroad tracks and wherein the cam engaging wheel means may be provided with a single wheel having clutch means for selective alternate opening and closing of the doors in either direction of car travel or may be provided with separate door opening wheels and door closing wheels and clutch means therefor.

OPERATING MECHANISM FOR VEHICLE DISCHARGE MEANS

CROSS-REFERENCE TO RELATED APPLICATIONS

This application is a division of U.S. Pat. application Ser. No. 718,892 filed Apr. 4, 1968.

BACKGROUND OF THE INVENTION

1. Field of the Invention

An economical method of transporting bulk material is by railroad integral trains of hopper cars. Delivery cost reduction depends on the number of cars required and the amount of loading time, shorter loading time being more efficient. Fast discharge of the bulk material, such as coal, during train motion is therefore required. Over-the-road locomotive type unloading systems never leave the train and the regular crew stays with the train, resulting in lower costs. The inventive design incorporates such features which substantially reduce the cost of coal delivery and provides for smooth operation of the discharge structure.

2. Description of the Prior Art

Various types of door operating mechanisms for side discharge type of railroad car hoppers have been provided where the operation of the door operating mechanism was performed manually at the load dumping site or by engaging a meandering track to operate a plurality of linkages. This requires either additional manpower or camming of tracks over which the railroad car would pass in order to transmit sufficient motion to the door operating mechanisms. Since a limited amount of space is available underneath the hopper cars for door operating linkage the present method provides an effective solution with a simplified ground mounted door opening cam means for the door operating mechanism that requires a minimum of space and yet is uncomplicated and most efficient in operation.

SUMMARY

This invention relates to an improved mechanism for opening and closing side discharge doors for the railroad hopper car or vehicle where the offcar initiating cam or rail means is located between the railroad tracks and is of simplified construction. The invention in particular is in the form of a flat surface rail adapted for frictional engagement with a gear operated wheel means in the confined space between underside hopper portions of the railroad car. The invention provides for a simplified gear construction employing gear means with its axis of rotation transverse to the direction of travel of the vehicle, the output of the gear means being transmitted through other gear means that has its axis of rotation about longitudinally extending shaft means which operate the door opening and closing mechanism. The shaft means carries flexible arms rotatably about a drive arrangement, the arms in the extended position being in the form of rigidified struts to hold the doors open. The invention is provided with between-the-track rail engaging wheel means which may have a clutch arrangement for selectively and alternately opening and closing the discharge doors. The wheel means may comprise a pair of wheels, one of which aids in opening the door and the other aids in closing the door.

These and other objects and advantages of the invention will become apparent from reference to the following description, attached drawings, and appended claims.

BRIEF DESCRIPTION OF THE DRAWINGS

FIG. 1 is a perspective view of a railroad hopper car employing the novel discharge arrangement;

DESCRIPTION OF THE PREFERRED EMBODIMENTS

Figure 2:
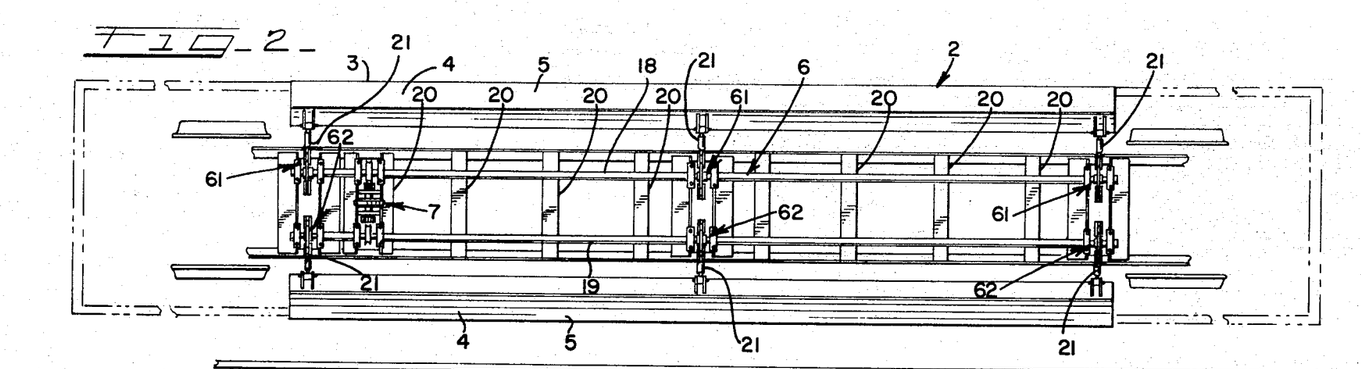
FIG. 2 is a bottom plan view of the hopper car.

With reference now to FIGS. 1—7 of the drawings and in particular with reference to FIGS. 1 and 2, there is shown a railroad hopper car 2 provided with hopper 3 having the lower discharge doors 4 as, for instance, shown in copending U.S. Pat. application of W. R. Shaver, Ser. No. 598,440, having filing date of Dec. 1, 1966, now U.S. Pat. NO. 3,459,317. The doors 4 are of the side discharge type and swing outwardly from the car hopper 3. The bottom of the hopper 3 is provided with a pair of lower V-shaped hopper discharge portions 5, each having a door 4. Door opening and closing operating mechanism 6 is provided for opening each of the two laterally spaced doors 4. The door operating mechanism 6 for opening the doors 4 is disposed underneath the hopper car 2 and is provided with between-the-track rail engaging structure 7 which frictionally engages the rail means 8 between the railroad track rails 9 and 10 for opening the doors 4 and engages the between-the-track rail means 11 between the track elements 9 and 10 for closing the hopper doors 4.

Figure 3:
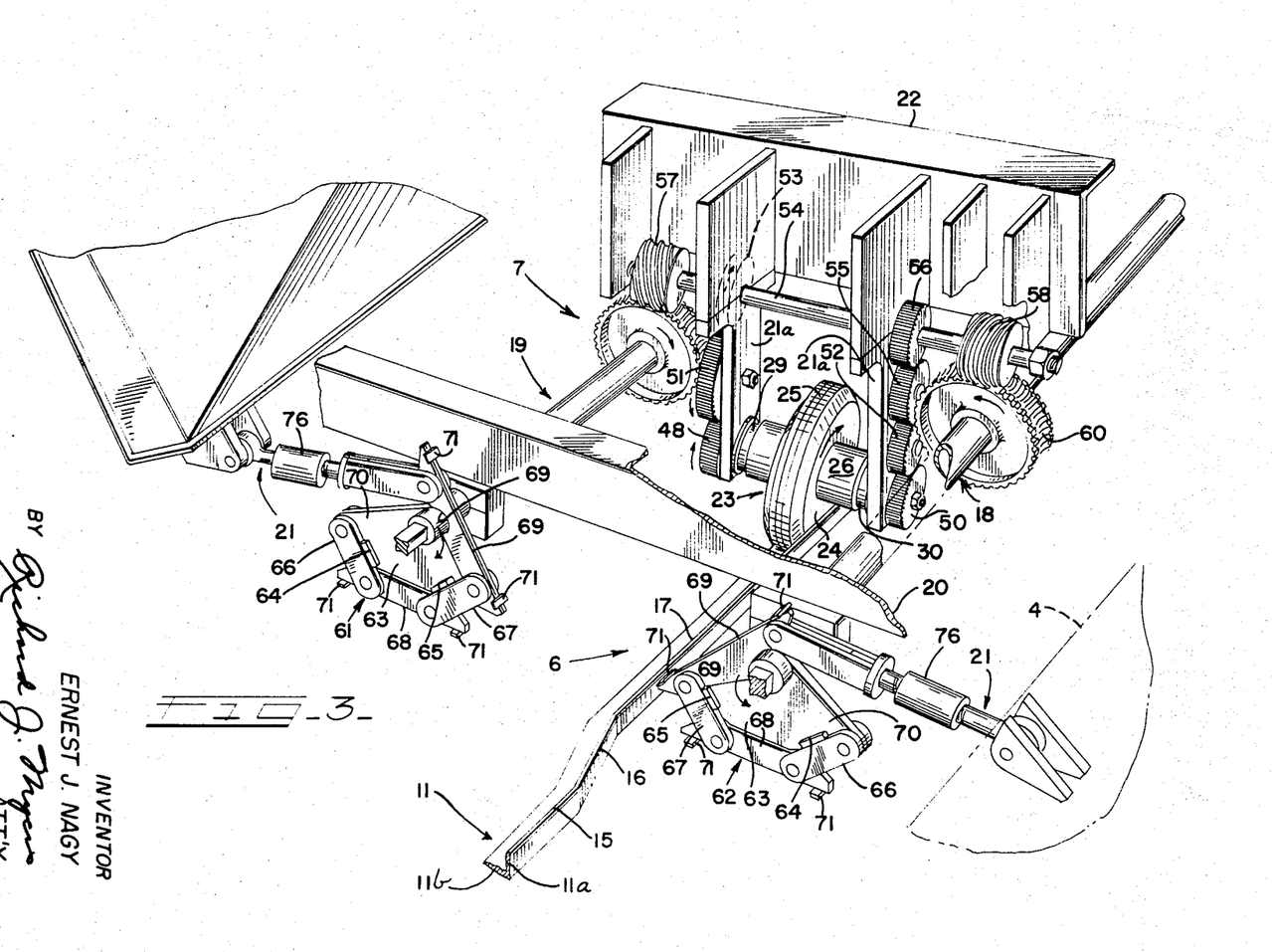
FIG. 3 is a perspective view of the door operating mechanism in the fully closed position.
Figures 4, 7:
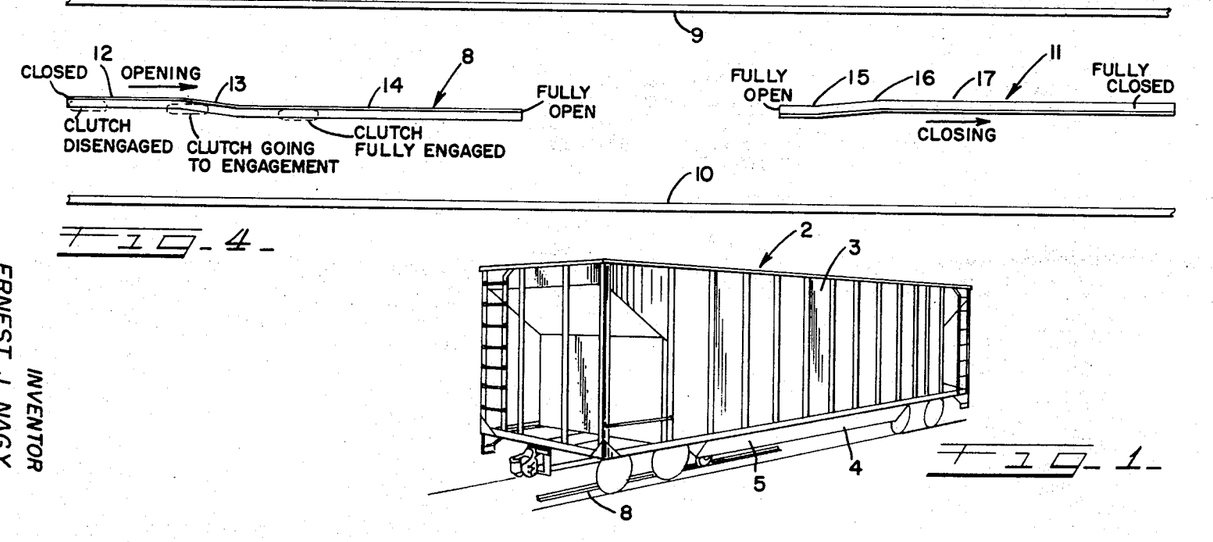
FIG. 4 is a plan view of the between-the-railroad-tracks door actuating rail means.
FIG. 7 is a cross-sectional view of the wheel and clutch arrangement for operation of the door operating mechanism.
Figures 5, 6:
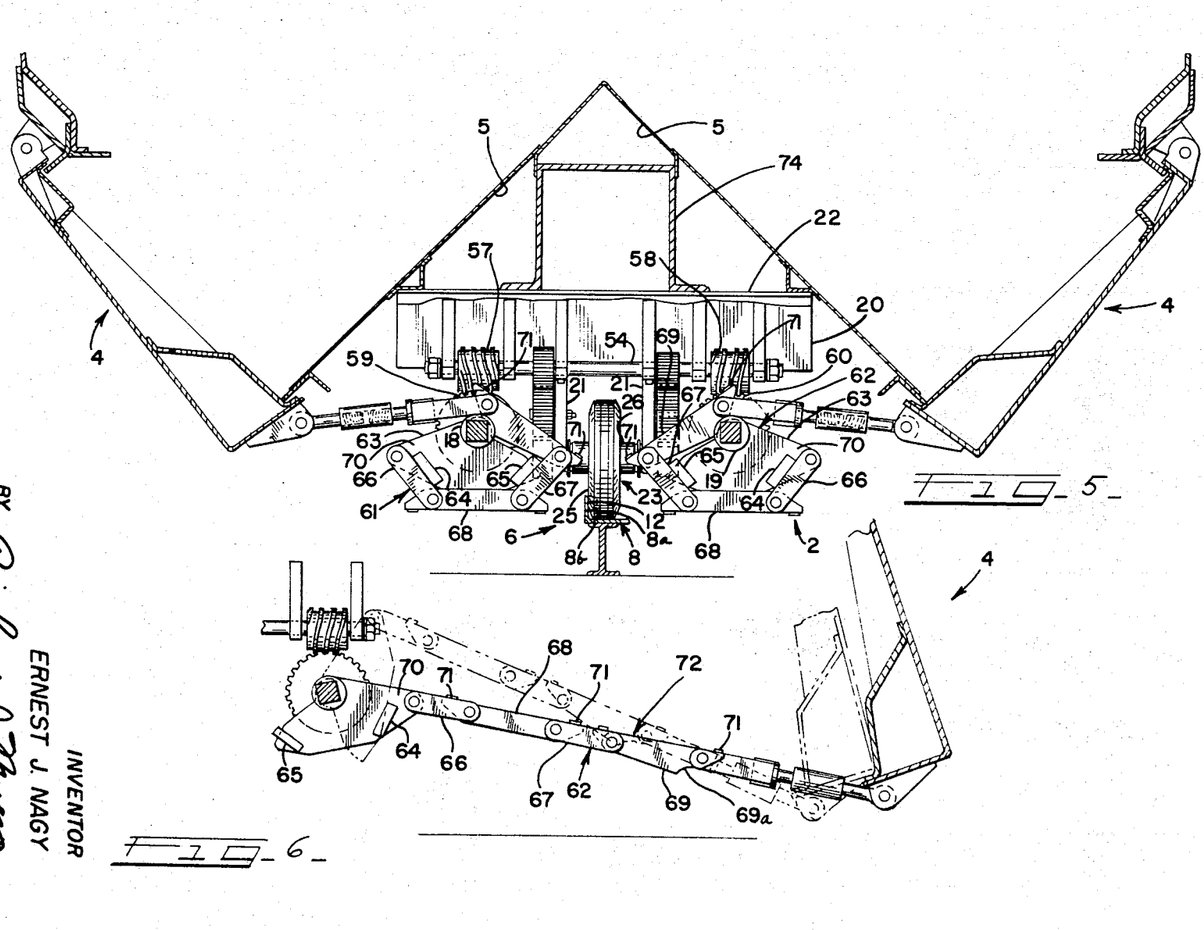
FIG. 5 is a cross-sectional view of the door operating mechanism in the fully closed position.
FIG. 6 is a partial view in cross section of the door connecting arms which go from a coiled to an extending rigid strutlike position.
Figure 7:
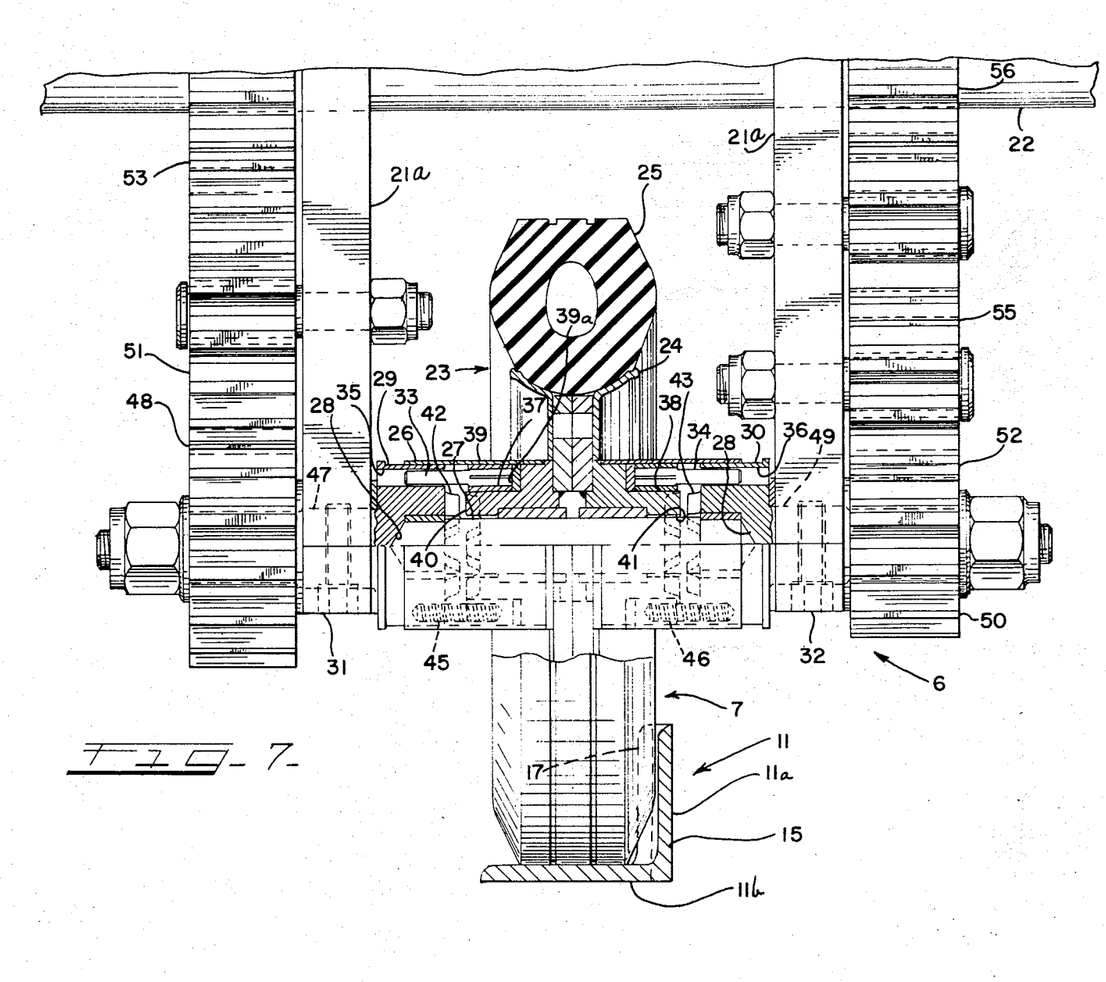
Figure 8:
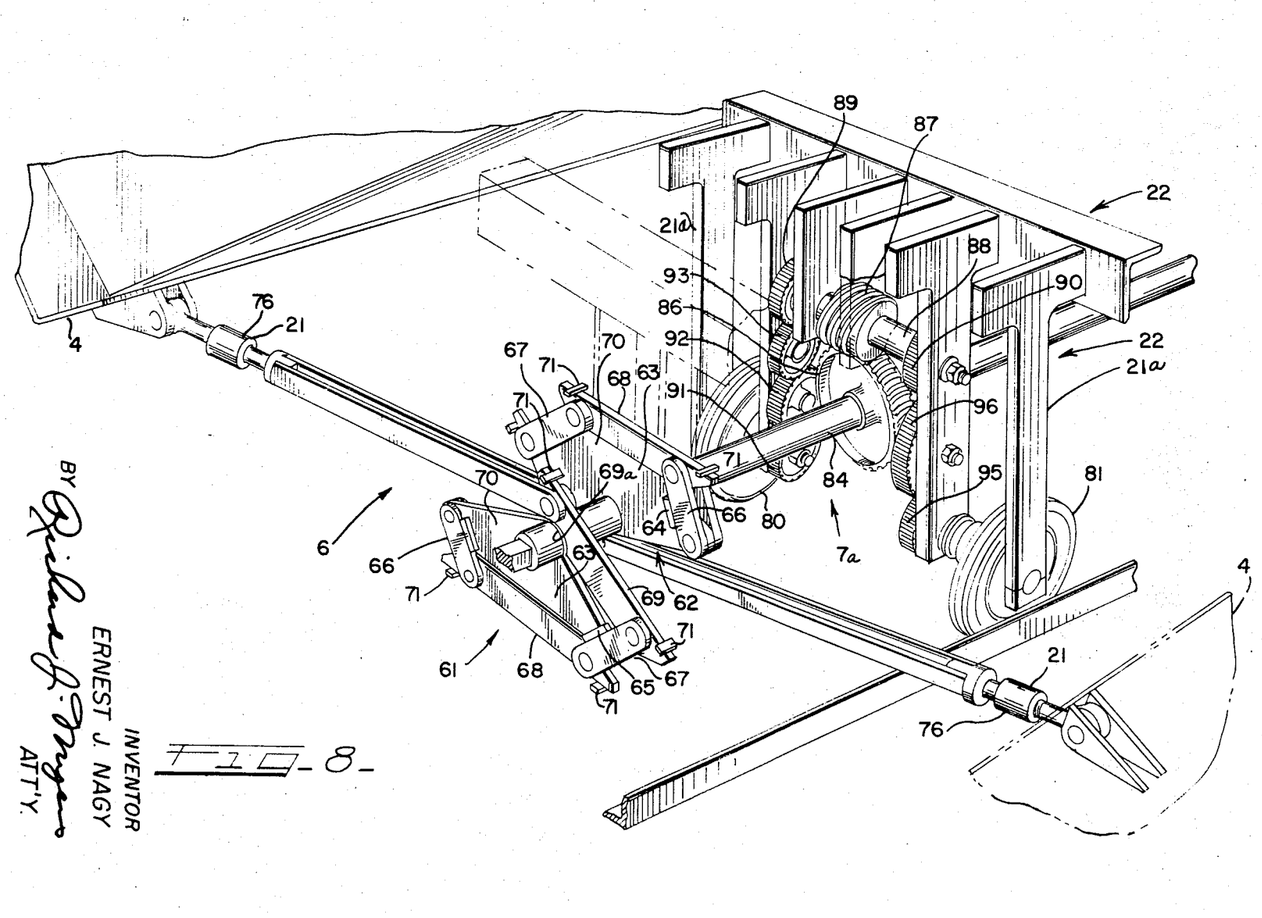
FIG. 8 is a perspective view of a modified form of door operating mechanism in the fully closed position.

The cam track 8 for opening the hopper car doors is generally L-shaped in vertical cross section and has a longitudinally extending straight entrant portion 12, a short intermediate portion 13 diverging outwardly to connect with an elongated extending straight exit portion 14 that is parallel to the track rails 9 and 10 like the first portion 12. The door closing cam track 11 is similarly L-shaped in vertical section and has a first or entrant portion 15 parallel to the track rails 9 and 10 and in line with portion 12 but spaced therefrom sufficiently to allow the coal to be dumped from the hopper car. The entrant portion 15 connects with an outwardly diverging portion 16 which connects with an exit portion 17 that is parallel to track rails 9 and 10. This is best seen in FIG. 4. As seen in FIG. 2, the door operating mechanism 6 is provided with a pair of longitudinally extending laterally spaced apart drive shaft structures 18 and 19 connected to the underside of the hopper car 2 to car cross member 20. The shaft structures 18 and 19 are connected with the between-the-track rail engaging structure 7 and are rotated thereby to operate opposite pairs of door operating linkage 21 disposed at each end and the center of the car and connecting with the doors 4 opening the doors to dump the contents in the V-shaped hopper discharge portions 5. The opening cam track 8 is also shown in FIG. 5 having an upright vertical portion 8a and lower horizontal portion 8b for engagement with the side and bottom of the wheel means of the cam engaging structure 7. FIGS. 3 and 7 similarly show the closing cam track 11 which has a vertical wall 11a and a horizontal bottom wall 11b for engaging the wheel means of the rail engaging structure 7. The construction of the cam tracks 8 and 11 consequently cause rotation and shifting of the wheel means for either opening or closing the hopper doors 4 respectively, as will be more fully explained.

With reference now to FIGS. 3 and 5—7, the between-the-track rail engaging structure 7 is suspended underneath the car by upright supports 21a which are part of transverse support structure 22 and comprises a wheel structure 23 having a rim 24 and an outer tire 25 of rubberlike or elastomeric material which engages the cam track 8 or 11. The rim 24 is fixedly mounted on a slidable tube structure 26 encircling shaft 27 having its end portions rotatively carried in bearing portions 28 of clutch members 29 and 30 rotatively journaled in bearing portions 31 and 32 of depending arms 21. The tube structure 26 surrounds a pair of transversely extending axially sliding pin structures 33 and 34, as best seen in FIG. 7, which when moved by movement of wheel 25 guidingly register with a respective aperture 35 or 36 in the clutch element 29 or 30. The tubular structure 26 concentrically and fixedly carries a pair of clutch parts 37 and 38 constrained for rotation with the outer tube part 39 or structure 26. The clutch parts 37 and 38 are provided with toothed portions 40 and 41 for alternate selective engagement with respective toothed portions 42 and 43 of the clutch members or elements 30 and 38. Centering springs 45 and 46 are received in openings in clutch elements 29 and 37 and clutch elements 30 and 38 respectively to prevent the clutch assembly 39a of elements 29 and 30 from engaging with either left clutch part 29 or right clutch part 30 until the wheel structure 23 engages an opening cam track 8 or a closing cam track 11 respectively whereby the wheel 23 is shifted to the left or right respectively for either of such clutch engagements to occur and rotatively drive one of the clutch elements 37 or 38 which will then rotate one of the clutch elements 29 or 30. When wheel 25 and its clutch parts 37 and 38 are not engaged, the pin means 33 and 34 and springs 45 and 46 are held against rotation by clutch parts 29 and 30 though wheel 25 may rotate. The axially sliding dowel pin means 33 and 34 and springs 45 and 46 do not rotate unless the clutch parts 29 and 37 or 30 and 38 are engaged with one another. Thus the pin means 33 and 34 protect the springs 45 and 46 preventing their twisting and misalignment. The clutch element 29 has constrained for rotation with it an outwardly extending shaft 47 which fixedly carries a spur gear 48 and the clutch part 30 is fixed to a shaft 49 for rotation of a spur gear 50 attached thereto, the shafts 47 and 49 being respectively rotatively journaled in the bearing portions 31 and 32 of each arm 21. The gear 48 meshes with the gear 51 above it carried by one of the arms 21a and the gear 50 meshes with the gear 52 above it which is carried by the other of the arms 21. The gear 51 meshes with the gear 53 above it on the shaft 54 carried by the arms 21a. The gear 52 meshes with the gear 55 carried by the arm 21a and the gear 55 meshes with the gear 56 carried by the shaft 54. It is to be noted that one more gear 55 is provided on the right side, as best seen in FIG. 3, to allow for a rotation of shaft 54 which is in the reverse direction that the shaft 54 would take were it driven by gear 51 on the left side. This is because the opening cam track 8 rotates the shaft 54 in one direction to open the hopper doors 4 as shown in FIG. 6 whereas the shaft 54 rotates in the opposite direction when engaging the track 11 (FIG. 8) to close the doors 4 as seen in FIG. 3. FIG. 7 shows the wheel 23 entering the beginning portion 15 of closing cam track 11 and having its side and bottom frictionally engaging cam side 11a and cam bottom 11b attendant to subsequently shifting the wheel 25 to the left for closing doors 4. Drive between the cross shaft 54 and left or right doors 4, as viewed in FIG. 5, is through worms 57 and 58 to open or close doors 4, depending on whether clutch parts 40, 42 or 41, 43 are engaged, to worm wheel or gears 59 and 60 to the longitudinal drive shafts 19 or 18 to flexible linkage or chain 61 or 62 to left or right door arms 21 to left or right doors 4. The shaft structures 19 or 18 drive three such sets of linkages 61 and 62 (see FIG. 1). The opening cam track 8 engages clutch parts 41, 43 for rotation of shaft 54 in direction shown in FIG. 3 to close the open doors and closing cam track 11 engages clutch parts 40, 42 to reverse direction of rotation of shaft 54 to open the closed door 4.

Each linkage 61 is similar to each linkage 62 and description of one suffices for the other. Each linkage 61 is segmented and comprises a crank arm 63 constrained for rotation with its shaft 19 or 18. The crank arm or sprocket 63 is somewhat triangular in shape and has link stop lugs 64 and 65 engageable in wound position (see FIGS. 3 and 5) around arm 63 with pivotal links 66 and 67 connecting with intermediate connecting pivotal link 68 and pivotal outer door arm connecting link 69 (curved at 69a to abut against shaft 18 or 19 in curled position), the link 66 pivotally connecting with end 70 of the crank arm 63. Each link 66, 67, 68 or 69 is provided with stops 71 engaging with its respective adjacent link to provide for a rigid member or strut 72, as shown in FIG. 6. The rigid strut 72 is rigid only in the fully open position of the door 4 and is held rigid by the gear arrangement and shafts and wheel portions of the rail engaging structure 7 engaging with the between-the-track cams 8 or 11. The supporting structure 22 is held to the car center sill 74 supporting the hoppers, as seen in FIG. 6. The door rods 21 are provided with rod link adjusting means or turnbuckles 76.

Thus, it is seen that the wheel of the mechanism 7 engaging the opening or closing crank engages the proper clutch for driving the proper linkage to open or close the doors 4, 4 depending on which cam track 8 or 11 is involved. This arrangement so operates regardless of which end of the car enters the cam track area. The wheel means 25 must be rotated as well as shifted laterally to operate the doors 4 so obstacles on the railroad bed such as a stone cannot operate the door operating mechanism.

Figure 9:
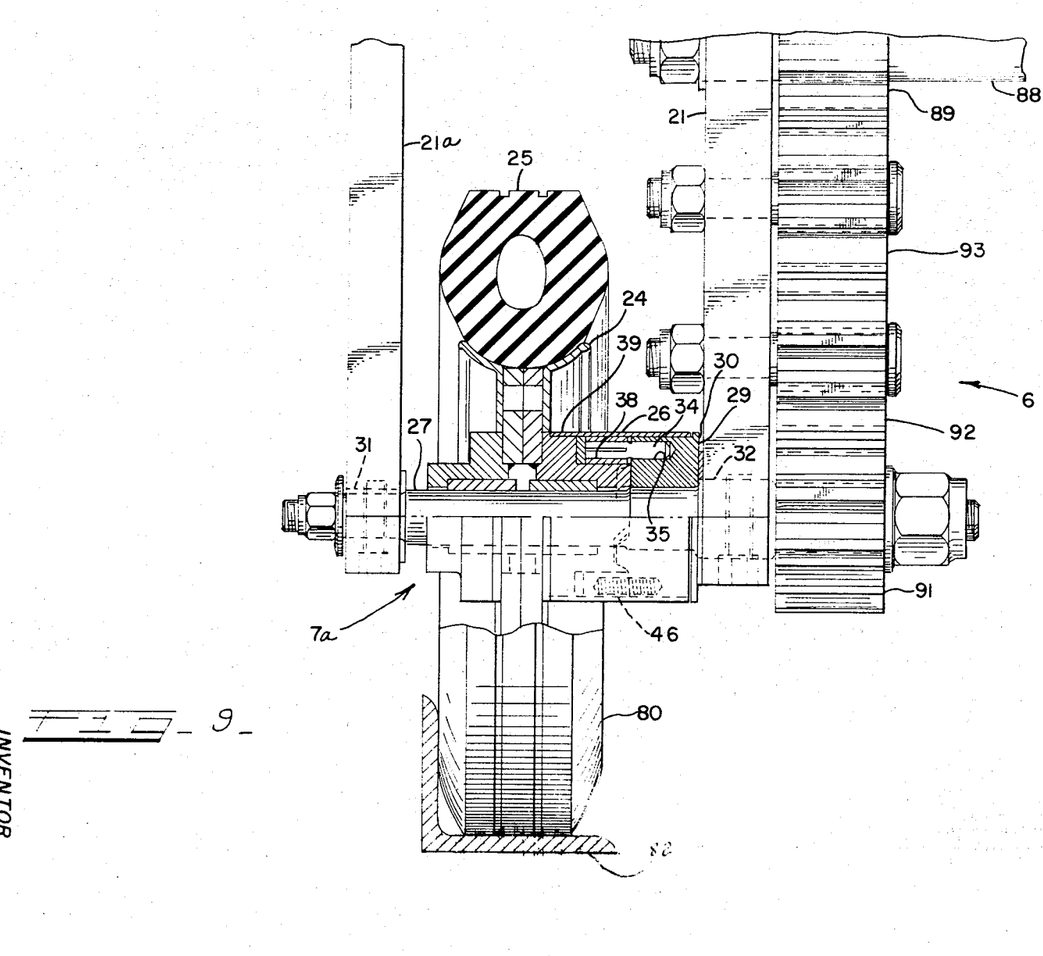
FIG. 9 is a cross-sectional view of the left wheel and clutch structure therefor of the modified form of the door operating mechanism for opening the hopper doors.
Figure 10:
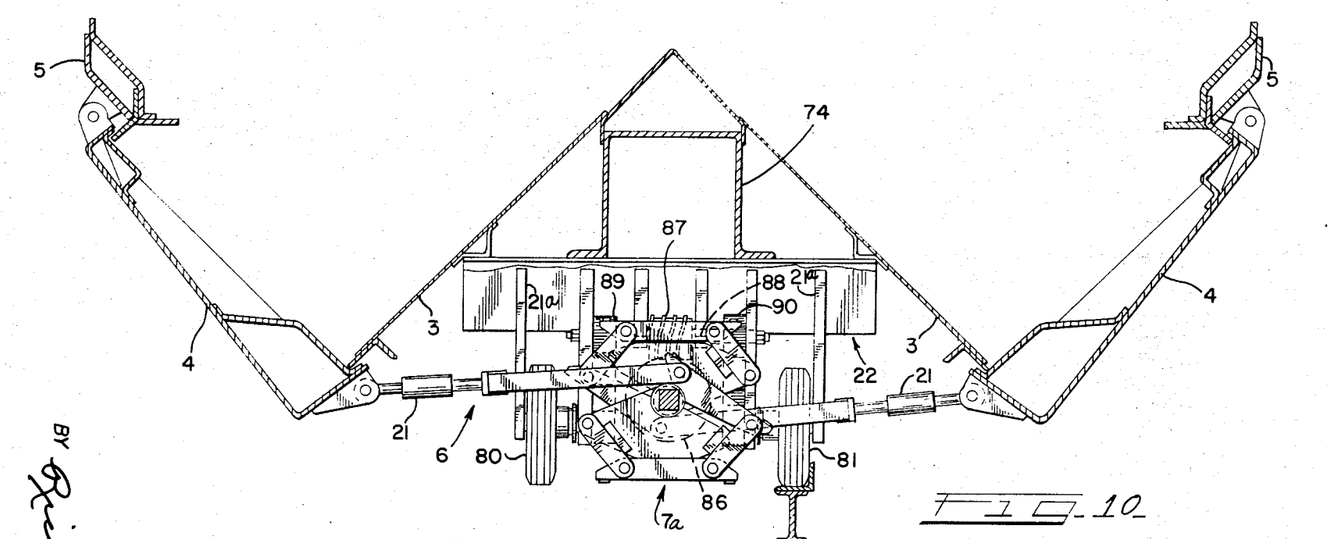
FIG. 10 is a cross-sectional elevational view of the modified form of door operating mechanism in the closed position.
Figure 11:
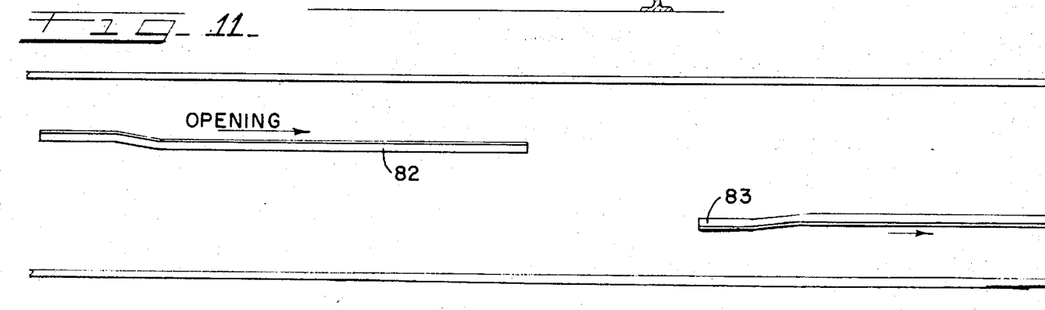
FIG. 11 is a plan view illustrative of the type of between-the-track rail to operate the modified form of door operating mechanism.

FIGS. 8 through 11 are illustrative of a modified form of the invention employing cam track engaging mechanism 7a which includes a pair of wheel structures 80 and 81 for respectively engaging opening track 82 (similarly constructed to track 8 of FIG. 4) and closing track 83 (similarly constructed to track 11, FIG. 4) spaced laterally of track 82. The door opening wheel is designated as 80 and the door closing wheel is designated as 81. Where like structure exists, the same reference characters will be used in the modified form as in the first mentioned embodiment. The second embodiment similarly employs flexible linkage 61 and 62 which, however, both (61 and 62) are on a common shaft 84 with linkage 62 therefor going under shaft 84. The opening and closing cam tracks 82 and 83 (FIG. 11) are similarly constructed to the opening and closing tracks of the first embodiment except that they are spaced laterally of one another to accommodate their respective wheels 80 and 81 for shifting them into the clutch engaged position as, for instance, shown by FIG. 9 where the left or door opening wheel 80 engages the left or beginning door opening cam track 82 as seen in FIG. 11 opening the doors. Wheel 81 similarly engages track 83 for the closing of the doors. The shaft 84 is provided with a main worm gear 86 engaging with worm 87 on shaft 88 carrying, at its opposed ends, gears 89 and 90. The wheel 80 drives gear 89 through gears 91, 92, 93. The wheel 81 drives gear 90 in the opposite direction through gears 95 and 96. It is noted that the gear train operated by the left wheel 80 has one more gear than the gear train operated by wheel 81 so that the one wheel 80 can open the doors and the other wheel 81 can close the doors. The clutching arrangement shown in FIG. 9 is similar to the clutching arrangement of the door opening wheel clutch parts 40 and 42 of the first embodiment and, therefore, the same reference characters are used as it functions in a similar manner, in that the wheel 80 is shifted to the right for clutch drive by door opening cam track 82. The wheel 80 is provided with tire 25 and rim 24 fixed on tubular structure 26 slidable on shaft 27 in journals 32 of support 21. The tubular structure has its clutch toothed part 41 engageable with clutch toothed part 43 to drive gear 50, the clutch parts 38 and 30 being alined by pin 34 and wheel 80 being centered by spring 46. Wheel 81 has similar clutch means (not shown) to be operated by cam track 83 moving wheel 81 to the left.

The forgoing description and drawings are given merely to explain and illustrate the invention, and the invention is not to be limited thereto, except insofar as the appended claims are so limited, since those skilled in the art who have the disclosure before them will be able to make modifications and variations therein without departing from the scope of the invention.

I claim:
1. A freight carrying vehicle comprising:
freight discharge hopper means;
discharge door means located at the lower end of the hopper means for discharging the freight from the vehicle;
door operating means for opening the door for discharge of the freight from the hopper comprising:
an intermediate door operating drive means in the form of movable wheel means;
gear means driven by said wheel means;
door opening arm means operatively connected with said gear means and said door means; and
clutch means for opening and closing said door means and operatively connecting with said wheel means, said wheel means being movable for selectively operating said clutch means to selectively operate said gear means to selectively open and close said vehicle doors.

2. A freight carrying vehicle comprising:
a freight carrying hopper means;
freight discharge door means located at the lower end of said hopper means;
freight discharge door operating means;
said door operating means comprising movable wheel means;
gear means operatively connecting with and driven by said wheel means;
door operating arm means operatively connected with said gear means and said door means;
said gear means having forward and reversing gear means for selectively opening or closing said door means; and
clutch means for opening and closing said door means and operatively connecting with said wheel means, said wheel means being movable for selectively operating said clutch means to selectively operate said gear means to selectively open and close said vehicle doors.

3. The invention according to claim 2, and:
shaft means being driven by said gear means;
door linkage drivingly connected with said shaft means including flexible arm means coilable about the shaft means; and
said flexible arm means being driven by said shaft means and being unwound by said shaft means into the form of rigid strut means for holding the door means in an open position.

4. The invention according to claim 3, and:
said shaft means being in the form of crank means; and
said flexible arm means being a plurality of links connected to and wound about said crank means.

5. The invention according to claim 4, and:
said crank means having a periphery and link stop means being mounted about the crank means periphery; and
said links engaging about said stop means when winding about said crank means in a coiled position.

6. The invention according to claim 4, and each of said links having an abutment adapted for engagement with an adjacent connecting link when the arm means are extended as a rigid strut to maintain the arm means in a rigid position and preventing collapse of same in one direction of rotation of the crank means when the door means are in the open position.

7. The invention according to claim 2, and said wheel means including a single wheel shiftable to selectively operate the gear means to selectively open and close said door means.

8. The invention according to claim 7, and said clutch means comprising a first clutch arrangement on one side of said wheel and a second clutch arrangement on the other side of said wheel where upon shifting of the wheel to one or other of the sides one of such clutch arrangements is engaged to selectively open or close said door means.

9. The invention according to claim 2, and:
said gear means including a door opening set and a door closing set;
said wheel means including a single wheel and said clutch means including a first clutch arrangement and a second clutch arrangement;
said first clutch arrangement having a first wheel clutch part on one side of said wheel and said second clutch arrangement having a second wheel clutch part on the other side of said wheel; and
said first clutch arrangement having a first clutch part connecting with said door opening set and said second clutch arrangement having a second clutch part connecting with said door closing set whereby when said first clutch arrangement is engaged by movement of said wheel means the door means is opened and whereby when said second clutch arrangement is engaged by movement of said wheel means in another direction said door means may be closed.

10. In a hopper vehicle having discharge hopper mean including: discharge door means located at the lower end thereof for discharge of material from the vehicle; and
door operating means for opening and closing of the door means comprising:
wheel means mounted for rotation and lateral shifting in either direction;
said wheel means rotatively carrying a door opening clutch part on one side and a door closing clutch part on the other side;
gear means mounted on one side of said door opening clutch part and second gear means mounted on the side of the door closing clutch part;
said first gear means having a door opening clutch part adapted for engagement with said door opening wheel clutch part upon movement of the wheel means thereto and said second gear means having a door closing clutch part adapted for engagement with said door closing wheel clutch part upon movement of the wheel means thereto;
transverse shaft means connecting with said first and second gear means and rotated in a door opening direction by said first gear means and a door closing direction by said second gear means;
longitudinally extending shaft means rotatable selectively in door opening and door closing directions respectively by said first and second gear means respectively; and
a pair of door arm means extending outwardly from one another from said shaft means and connected with said shaft means for driving connection with a respective one of a pair of doors of the vehicle door means.

11. The invention according to claim 10, and:
each door arm means comprising a sprocket means on said shaft means and flexible linkage coiled about said sprocket means in the door closing position and extendable outwardly to a rigid strut position in the door opening position; and
means on said door links for maintaining the door arm means in a rigid position in the door opening position.

12. The invention according to claim 10, and said shaft means comprising a pair of shafts each coupling with a respective door arm means.

13. The invention according to claim 10, and said shaft means comprising a single shaft carrying each of the sprocket means longitudinally spaced from one another.

14. The invention according to claim 10, and said wheel means comprising a pair of wheels one of which carries the door opening wheel clutch part and the other of which carries the door closing wheel clutch part.

15. In a freight carrying vehicle having freight discharge hopper means having discharge door means located at the lower end thereof for discharging the freight from the vehicle, door operating means for opening the door for discharge of the freight from the hopper comprising:
an intermediate door opening drive means in the form of movable wheel means;
drive means driven by said wheel means;
door opening arm means operatively connected with said drive means and said door means; and clutch means for opening and closing said door means and operatively connecting with said wheel means, said wheel means being movable for selectively operating said clutch means to selectively operate said drive means to selectively open and close said vehicle doors.

16. In a freight carrying vehicle comprising:

a freight carrying hopper means;

freight discharge door means located at the lower end of said hopper means;

freight discharge door operating means;

said door operating means comprising movable wheel means;

drive means operatively connecting with and driven by said wheel means;

door opening arm means operatively connected with said drive means and said door means;

said drive means having forward and reversing drive means for selectively opening or closing said door means; and clutch means for opening and closing said door means and operatively connecting with said wheel means, said wheel means being adapted for selectively operating said clutch means to selectively operate said drive means to selectively open and close said vehicle doors.

17. The invention according to claim 16, and:

said clutch means including a door opening clutch member and a door closing clutch member each constrained for rotation with said wheel means;

said clutch means including a door opening clutch element and a door closing clutch element constrained for rotation with said drive means;

said door opening clutch member being engageable with said door opening clutch element upon movement of said wheel means and door opening clutch member thereby into engagement with said door opening clutch element to open said door means and said door closing clutch member being engageable with said door closing clutch element upon movement of said wheel means and said door closing clutch member thereby into engagement with said door closing clutch element;

biasing means being constrained for rotation with each of said clutch elements and independent of rotation of each of said clutch members and being biasingly engaged between a respective door opening clutch element and member and between a respective door closing clutch element and member for biasing said clutch members away from engagement with said clutch elements; and alining pin means constrained for rotation with each of said clutch elements and independent of rotation of each of said clutch members to prevent misalignment of said biasing means.

18. The invention according to claim 17, and:

said wheel means including a wheel carrying both the door opening and door closing clutch members in opposed relation with respect to one another for engagement with their respective door opening and door closing clutch elements;

said biasing means including a first biasing element between one clutch member and element and second biasing means between the other clutch member and element; and said pin means including a first pin between one element and clutch and a second pin between the other element and clutch.

19. The invention according to claim 17, and:

said wheel means including a pair of wheels, one wheel carrying a door opening clutch member and the other wheel carrying a door closing member;

said drive means including a door opening gear means and a door closing gear means;

said door opening gear means having a door opening clutch element and adapted for engagement with the door opening clutch member;

said door closing gear means having a door closing clutch element for engagement with the door closing clutch member;

said biasing means including a first biasing element between one clutch member and element and a second biasing means between the other clutch member and element and said pin means including a first pin between the element and clutch and a second pin between the other clutch and element.